United States Patent Office 3,278,488
Patented Oct. 11, 1966

3,278,488
CURABLE MIXTURES OF EPOXY RESINS SULFOLENE ADDUCTS AND POLYAMINES
Erwin Nikles, Allschwil, Basel-Land, Hans Batzer, Arlesheim, Otto Ernst, Pfeffingen, Basel-Land, and Heinz Zumstein, Basel, Switzerland, assignors to CIBA Limited, Basel, Switzerland, a company of Switzerland
No Drawing. Filed Apr. 2, 1962, Ser. No. 184,559
Claims priority, application Switzerland, Apr. 6, 1961, 4,005/61
1 Claim. (Cl. 260—47)

It is known that epoxy resins can be cured with polyamines, such as ethylene diamine or diethylene triamine. In contrast to the use of polycarboxylic acid anhydrides which are hot-curing agents, the use of polyamines enables the "cold curing" of epoxy resins at room temperature. However, the heat distortion characteristics of the cold-cured resins are inferior to those of resins that have been hot-cured with polycarboxylic acid anhydrides.

It has also been proposed to cure epoxy resins with adducts from aliphatic polyamines and sulfolenes; compared with the ordinary polyamines such adducts have the advantage of being less volatile and less toxic. The mechanical properties and the heat distortion of epoxy resins cured with such adducts are as a rule, however, of the same order, or in some cases even poorer, than the values obtained for comparable products cured with the aid of the simple polyamines.

It was extremely surprising to find that cured resins having much better heat distortion characteristics and, in general, also distinctly better mechanical properties—such as impact strength and flexural strength—are obtained by using as curing agents for epoxy resins mixtures of polyamines with adducts from sulfolenes and polyamines that contain at least one active amine hydrogen atom. Furthermore, the cure of epoxy resins with such mixtures proceeds at room temperature much more rapidly than the cure with each of the individual constituents of the mixture.

Accordingly, the present invention relates to curable mixtures that contain
(1) An epoxy compound having an epoxy equivalency greater than 1,
(2) A polyamine, and
(3) An adduct of a polyamine containing at least one active amine hydrogen atom with a sulfolene.

The invention further provides a process for curing epoxy compounds having an epoxy equivalency greater than 1 with the aid of polyamines, wherein the curing agent used is a mixture of a polyamine and an adduct from a sulfolene and a polyamine containing at least one active amine hydrogen atom.

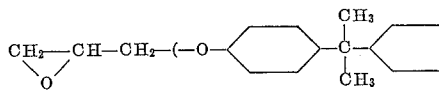 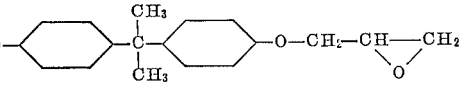

The epoxy compounds present in the curable mixtures of the invention have an epoxy equivalency greater than 1 that is to say they contain $x$ epoxide groups calculated from the average molecular weight, $x$ being a whole or fractional number greater than 1.

As is known, by the conventional methods of manufacturing polyepoxy compounds there are obtained crude industrial mixtures of compounds having different molecular weights, and said mixtures further contain a share of compounds whose terminal epoxide groups have been partially hydrolyzed. The analytically determined value for the epoxy equivalency of such industrial mixtures need not be a whole number which is at least 2, but in each case it must be higher than 1.

As examples of suitable epoxy compounds of the kind defined above there may be mentioned: Alicyclic polyepoxides such as vinylcyclohexene dioxide, limonene dioxide, dicyclopentadiene dioxide, ethyleneglycol-bis-(3:4-epoxy-tetrahydrodicyclopentadien-8-yl)-ethers, (3:4-epoxy-tetrahydrodicyclopentadien-8-yl)-glycidyl ethers; epoxidized polybutadienes or copolymers of butadiene with ethylenically unsaturated compounds such as styrene or vinyl acetate; compounds containing two epoxy-cyclohexyl radicals such as diethyleneglycol-bis-(3:4-epoxycyclohexane carboxylate), bis-(3:4-epoxy-cyclohexylmethyl)-succinate, 3:4-epoxy-6-methylcyclohexylmethyl-3:4-epoxy-6-methylcyclohexane carboxylate and 3:4-epoxy-hexahydrobenzal-3:4-epoxy-cyclohexane-1:1-dimethanol.

Further suitable are polyglycidyl esters such as are formed when a dicarboxylic acid is reacted with epichlorohydrin or dichlorohydrin in the presence of alkali. Such polyesters may be derived from aliphatic dicarboxylic acids such as succinic or adipic acid or more especially from aromatic dicarboxylic acids such as phthalic or terephthalic acid. There may be mentioned as examples diglycidyl adipate and diglycidyl phthalate.

Further suitable are basic polyepoxy compounds such as are obtained by reacting a primary or secondary aliphatic or aromatic diamine, such as aniline, toluidine, 4:4'-diamino diphenylmethane, 4:4'-di-(monomethylamino)-diphenylmethane or 4:4'-diamino diphenylsulfone, with epichlorohydrin in the presence of alkali.

Preferred use is made of polyglycidyl ethers such as are obtained by etherifying a dihydric or polyhydric alcohol or diphenol or polyphenol with epichlorohydrin or dichlorohydrin in the presence of alkali. These compounds may be derived from glycols, such as ethyleneglycol, diethyleneglycol, triethyleneglycol, 1:3-propyleneglycol, 1:4-butyleneglycol, 1:5-pentanediol, 1:6-hexanediol, 2:4:6-hexanetriol, glycerol or more especially from diphenols or polyphenols such as resorcinol, pyrocatechol, hydroquinone, 1:4-dihydroxynaphthalene; or from condensation products of phenol with formaldehyde of the type of the resoles or novolaks, bis-[para-hydroxyphenyl]-methane, bis-[para-hydroxyphenyl]-methylphenylmethane, bis-[para-hydroxyphenyl]-tolylmethane, 4:4'-dihydroxydiphenyl, bis-[para-hydroxyphenyl]-sulfone and more especially from bis-[para-hydroxyphenyl]-dimethylmethane.

Particularly suitable epoxy resins are those which are liquid at room temperature, for example those which have been prepared from bis-(para-hydroxyphenyl)-dimethylmethane (bisphenol A) and contain about 3.8 to 5.8 epoxide equivalents per kg. Such epoxy resins correspond, for example, to the average formula in which $z$ is a whole or fractional small number from 0 to 2.

There may also be used mixtures of two or more of the epoxy resins referred to above.

As polyamines suitable for incorporation in the curable mixtures of the invention there may be mentioned primary, secondary and tertiary amines of the alphatic, cycloaliphatic, araliphatic and aromatic series, for example: dipriamy alkylene polyamines such as thylene diamine, diethylene triamine, triethylene tetramine, tetraethylene pentamine, trimethylene diamine, hexamethylene diamine; alkylene polyamines containing a primary amino group as well as a tertiary amino group, such as a dialkylamino group, for example N:N-dimethylethylene diamine, N:N - diethylene diamine, N:N - dimethyl-1:3-propylene diamine, N:N-diethyl-1:3-propylene diamine, N-methyl-N-ethyl - 1:3-propylene diamine, N-methyl-N-butyl-1:3-propylene diamine, N:N-dipropyl-1:3-propylene diamine, N:N-dibutyl - 1:3 - propylene diamine, N:N-di-(2-ethylhexyl) - 1:3 - propylene diamine; completely alkylated alkylene polyamines such, for example, as tetramethyl-ethylene diamine, tetramethyl diethylene triamine, pentamethyl diethylene triamine, hexamethyl triethylene tetramine, heptamethyl tetraethylene pentamine, bis[N:N-diethylamino - ethylaminoethyl] - amine, bis-[N:N-di-methylamino-ethyl]-ether, bis-[N:N - diethylaminoethyl]-sulfide, tri-[N:N-diethylaminoethyl]-amine, N:N:N':N'-tetramethyl - 1:2 - diaminopropane, N:N:N':N' - tetramethyl-2:4-diamino-2-methylpentane; N:N'-tetramethyl-1:3-diaminopropanol-2; N - hydroxyalkyl - alkylene polyamines such, for example, as N-hydroxyethyl ethylene diamine, N-hydroxyethyl pentamethylene diamine, N-hydroxypropyl tetramethylene diamine, N-hydroxyethyl diethylene triamine, N:N - di - (hydroxyethyl) - diethylene triamine, N:N"-di-hydroxyethyl) - diethylene triamine, N-hydroxypropyl diethylene triamine, N:N-di-(hydroxypropyl)-diethylene triamine, N:N"-di-(hydroxypropyl)-diethylene triamine, N:N:N" - tri-(hydroxypropyl)-triethylene tetramine, N-hydroxyethyl propylene diamine, N-hydroxypropyl propylene diamine, N-hydroxyethyl dipropylene triamine, N:N - di(hydroxyethyl) - dipropylene triamine, N:N:N'-tri-(hydroxyethyl)-triethylene tetramine; cyanoethylated primary polyamines such, for example, as the reaction products of 1 to 2 molecular proportion of acrylonitrile with 1 molecular proportion of ethylene diamine, diethylene triamine or triethylene tetramine; cycloaliphatic polyamines such as 1:2-diaminocyclohexane, 1:4-diaminocyclohexane, 1:3-diaminocyclohexane, 1:2-diamino-4-ethylcyclohexane, 1:4 - diamino-3:6-diethylcyclohexane, 1 - cyclohexyl-3:4-diaminocyclohexane, 1:4-bis-[methylamino]-cyclohexane, dodeca-hydrobenzidine, 4:4'-diamino-dicyclohexylmethane, 4:4'-diamino-dicylohexylpropane, 4:4'-diamino-tricyclo - hexylmethane, N-cyclohexyl propylene diamine, N-cyclo-hexyl ethylene diamine, N:N'-dicyclohexyl propylene diamine, N:N'-dicyclohexyl diethylene triamine, N:N'-di-[2-ethylcyclohexyl]-propylene diamine, N:N' - di - [cyclohexyl-methyl]-ethylene diamine; arliphatic polyamines such, for example, as N-phenyl propylene diamine,
N-[2-ethylphenyl]-propylene diamine,
N-[4-phenylcyclohexyl]-ethylene diamine,
1:4-bis[ε-aminobutyl]-tetraethylbenzene,
bis-[β-aminoethyl]-durene,
bis-[β-amino-n-propyl]-durene,
bis-[ω-aminohexyl]-durene,
bis-[γ-aminopropyl]-isodurene,
1:4-bis-[β-aminoethyl]-2:3:6-trimethylbenzene,
1:4-bis-[β-aminoethyl]-benzene,
bis-[β-aminoethyl]-mesitylene;

ortho-, para- and metaxylylene diamine; furthermore araliphatic tertiary polyamines of the type of the Mannich's bases such, for example, as 2-[dimethylaminomethyl]-phenol,
2:6-di-[dimethylaminomethyl]-phenol,
2:4:6-tri-[dimethylaminomethyl]-phenol,
2:4:6-tri-[dihydroxy-diethylaminomethyl]-phenol,
2:4:6-tri-[morpholinomethyl]-phenol,
2-[dimethylaminomethyl]-6-methylphenol,
2-[dimethylaminomethyl]-4-octylphenol,
2-[dimethylaminomethyl]-3:5-dimethyl-phenol,
2:4:6-tri-[piperidinomethyl]-phenol,
2:4:6-tri-[dimethylaminomethyl]-3-methylphenol,
2-methoxy-6-[dimethylaminomethyl]-phenol,
1-[dimethylaminomethyl]-2-naphthol,
4:4'-dihydroxy-3:5:3':5'-tetra-[dimethylaminomethyl]-diphenyl-dimethylmethane;

aromatic polyamines such, for example, as benzidine,
1:2-phenylene diamine,
1:3-phenylene diamine,
1:4-phenylene diamine,
4:4'-diamino-diphenylmethane,
4:4'-diamino-diphenylamine,
4:4'-diamino-diphenyl-dimethylmethane,
4:4'-diamino-diphenyl-sulfide, -sulfone or -oxide;
4:4'-diamino-diphenyl urea,
2:2'-diamino-diphenylmethane,
4:4'-di-[N-monomethylamino]-diphenylmethane,
4:4'-di-[N-monoethylamine]-diphenylmethane,
4:4'-di-[N-monobutylamino]-diphenylmethane;

hydrazine and its derivatives such as phenyl hydrazine, 2-phenyl-2-hydroxyethyl hydrazine and 2-hydroxyethyl hydrazine; finally, heterocyclic polyamines such as piperazine.

It will be readily understood that it is also possible to use mixtures of two or more such polyamines.

The curable mixtures of the invention must contain as the third component an adduct of a polyamine with a sulfolene which adduct may be derived from the above-mentioned polyamines or their mixtures, provided that they contain at least one primary or secondary amine group. The sulfolene used as starting material for the adducts may be unsubstituted or substituted, for example by halogen atoms, hydroxyl groups or organic radicals, more especially by aliphatic, cycloaliphatic, araliphatic or aromatic hydrocarbon radicals. In general it is immaterial whether the starting material used is an α-sulfolene (2-sulfolene) whose double bond lies between carbon atoms 2 and 3 or 4 and 5, or is a β-sulfolene (3-sulfolene) whose double bond is between carbon atoms 3 and 4. These sulfolenes are prepared by reacting sulfur dioxide upon a conjugated diene, such as butadiene, isoprene or chloroprene. Their manufacture has been described in detail, for example, in British specification No. 361,341 and in German specification No. 506,839. Suitable sulfolenes are, for example, sulfolene, 2-methylsulfolene, 2:5-dimethylsulfolene, 2:4-dimethylsulfolene, 3:4-dimethylsulfolene, 3-methylsulfolene, 3-ethylsulfolene, 2-methoxysulfolene, 3-chlorosulfolene, 2-ethylsulfolene, 2-methyl-3-ethylsulfolene and 2-methyl-3-propylsulfolene.

A preferred type of adducts of sulfolenes and polyamines corresponds to the general formula

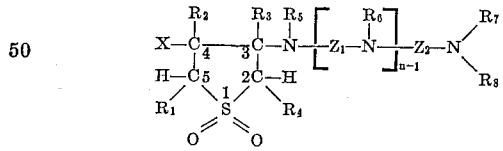

in which each of the radicals $R_1$ to $R_8$ represents a hydrogen atom or a lower alkyl radical with 1 to 4 carbon atoms; X represents a hydrogen or halogen atom, an alkoxy group or a lower alkyl radical with 1 to 4 carbon atoms; $Z_1$ and $Z_2$ each represents a divalent aliphatic, cycloaliphatic, araliphatic or aromatic hydrocarbon radical, and $n$ is a whole number from 1 to 4.

The adducts can be prepared by simply mixing together the polyamine and the sulfolene with moderate heating, for example to a temperature ranging from 60 to 80° C. It is therefore possible to prepare the curable mixtures of the invention by manufacturing the curing agent mixture of polyamine and adduct in situ by mixing the sulfolene with the requisite stoichiometric excess of polyamine. In this manner the curing agent mixture can be prepared by first heating it separately and then adding the epoxy resin. Alternatively, in certain cases the three starting components—that is to say the epoxy resin, the polyamine and the sulfolene—may be simultaneously mixed together, whereupon the exothermic reaction between the epoxy resin and the polyamine heats up the reaction mixture sufficiently to ensure the formation of the adduct from the polyamine and the sulfolene.

It has further been found that cured products having optimum properties (more especially flexural strength, impact strength and heat distortion point according to Martens) are obtained by using for every epoxide equivalent of the epoxy compound 0.2 to 2.0, preferably 0.5 to 1.5, gram-atoms of active amine hydrogen atoms and/or N-bound alkyl groups of the amine curing agent mixture of the polyamine with the polyamine+sulfolene adduct.

Furthermore, it is of advantage to select the molecular proportions of the polyamine and the polyamine+sulfolene adduct so that for every molecular proportion of the polyamine 0.25 to 4, preferably 0.5 to 2, molecular proportions of the adduct are used.

The term "curing" as used in this context describes the conversion of the epoxy compound into an insoluble and infusible resin.

The curable mixtures of the invention may further contain suitable plasticisers such as dibutyl phthalate, dioctyl phthalate or tricresyl phosphate, inert diluents or so-called active diluents, more especially a monoepoxide, for example butyl glycide or cresyl glycide.

There may be further added to the curable mixtures of the invention at any stage prior to the curing conventional additives such as fillers, dyestuffs, pigments, flame-proofing substances, mould lubricants and the like. Suitable extenders and fillers are, for example, asphalt, bitumen, glass fibers, mica, quartz meal, cellulose, kaolin, ground dolomite, colloidal silicic acid having a large specific surface (Aerosil) or metal powders such as aluminum powder.

The curable mixtures of the invention can be used in the unfilled or filled state, if desired in the form of solutions or emulsions, as laminating resins, paints, lacquers, dipping resins, casting resins, moulding compositions, sealing compounds, putties, flooring compositions, potting and insulating compounds for the electrical industry, as adhesives and the like, and also for the manufacture of such products.

Parts and percentages in the following examples are by weight, and the relationship between parts by weight and parts by volume is the same as that between the kilogram and the liter.

The curable mixtures of the invention used in the Examples were cured with the polyamine+sulfolene adducts I to VIII described below:

(I) ADDUCT FROM SULFOLENE AND ETHYLENE DIAMINE

A solution of 590 parts of commercial β-sulfolene (butadienesulfone) in 600 parts of ethylene diamine is heated for 24 hours at 60° C. The excess ethylene diamine is then distilled off, finally in a water-jet vacuum, to yield as a residue 856 parts of N-(3-sulfolanyl)-ethylene diamine.

(II) ADDUCT FROM SULFOLENE AND DIETHYLENE TRIAMINE

A solution of 590 parts of commercial β-sulfolene (butadienesulfone) in 516 parts of diethylene triamine is heated for 25 hours at 60° C. and then for 18 hours at 80° C. The volatile constituents are removed by heating for 2 hours at 100° C. in a high vacuum. Residue: 1091 parts of the adduct.

(III) ADDUCT FROM SULFOLENE AND TRIETHYLENE TETRAMINE

A solution of 590 parts of commercial β-sulfolene (butadienesulfone) in 730 parts of triethylene tetramine is heated for 24 hours at 60° C. and then for 24 hours at 80° C. The volatile constituents are removed by heating the batch for 2 hours at 100° C. in a high vacuum. Residue: 1303 parts of the adduct.

(IV) MIXTURE OF TRIETHYLENE TETRAMINE AND AN ADDUCT FROM SULFOLENE AND TRIETHYLENE TETRAMINE 438 parts of commercial triethylene tetramine are added to a solution of 180 parts of commercial β-sulfolene (butadienesulfone) in 700 parts of water. The mixture is heated for 2 days at 65° C. The water is evaporated in a water-jet vacuum and the residue is dried by being heated for 3 hours at 140° C. in a high vacuum. Yield: 597 parts of a mixture of triethylene tetramine and the adduct of β-sulfolene with triethylene tetramine.

(V) ADDUCT FROM SULFOLENE AND HEXAMETHYLENE DIAMINE

A mixture of 348 parts of hexamethylene diamine and 354 parts of commercial β-sulfolene (butadienesulfone) is heated for 2 days at 60° C. and then for 1 day at 80° C. The viscous adduct crystallizes at room temperature.

(VI) ADDUCT FROM SULFOLENE AND N:N-DIMETHYL-1:3-TRIMETHYLENE DIAMINE 236 parts of β-sulfolene (butadienesulfone), purified by crystallization from water, are mixed with 410 parts of N:N-dimethyl-1:3-trimethylene diamine, and the mixture is heated for 5 days at 60° C. The excess starting material is distilled off in a water-jet vacuum. Yield: 428 parts of N-(3-sulfolanyl)-N':N'-dimethyl trimethylene diamine.

(VII) ADDUCT FROM SULFOLENE AND 4:4'-DIAMINO DICYCLOHEXYL DIMETHYL METHANE 59 parts of powdered commercial β-sulfolene (butadienesulfone) and 119 parts of 4:4'-diamino-dicyclohexyl dimethylmethane are stirred and heated for 5½ days at 60° C. After cooling, the adduct is obtained in the form of a thickly liquid oil.

(VIII) ADDUCT FROM 3-METHYLSULFOLENE AND ETHYLENE DIAMINE 34.1 parts of 3-methyl-3-sulfolene (isoprenesulfone) and 60.1 parts of ethylene diamine are heated for 2 days at 80° C. On evaporation of the excess ethylene diamine there are obtained 44.2 parts of the liquid adduct.

*Example 1*

In 100 parts each of a polyepoxy compound, which is liquid at room temperature, contains 5.3 epoxide equivalents per kg. and has been prepared by reacting epichlorohydrin with bis-(para-hydroxyphenyl)-dimethylmethane in the presence of alkali, there are incorporated as curing agent, at room temperature:

In Test 1: 10 parts of triethylene tetramine,
In Test 2: 16 parts of triethylene tetramine,
In Test 3: 35 parts of the adduct III described above, and
In Test 4: 23 parts of a curing agent mixture consisting of 11.5 parts of adduct III and 11.5 parts of triethylene tetramine.

One portion each of the resulting curable casting resin mixtures is poured at room temperature into aluminum tubes (40 x 10 x 140 mm.) and each casting is cured for 24 hours at 40° C.

The cured castings have the properties shown in the following table:

| Test | Impact strength, cm.kg./cm.² | Flexural strength, kg./mm.² | Heat distortion point according to Martens (DIN) in ° C. |
|---|---|---|---|
| 1 | 6.4 | 11.0 | 63 |
| 2 | 6.5 | 11.1 | 55 |
| 3 | 4.1 | 9.8 | 67 |
| 4 | 8.1 | 11.7 | 83 |

Similarly advantageous results are obtained when in Test 4 adduct IV is used instead of the curing agent mixture.

*Example 2*

The procedure used is as described in Example 1, except that the following curing agents are used:

In Test 1: 10 parts of N:N-dimethyl-1:3-trimethylene-diamine,
In Test 2: 15 parts of adduct VI, and
In Test 3: 13 parts of a curing agent mixture consisting of 6.5 parts of adduct VI and 6.5 parts of N:N-dimethyl-1:3-trimethylene-diamine.

The properties of the cured castings are shown in the following table:

| Test | Impact strength, cm.kg./cm.$^2$ | Flexural strength, kg./mm.$^2$ | Heat distortion point according to Martens (DIN) in ° C. |
|---|---|---|---|
| 1 | 15.0 | 11.9 | 64 |
| 2 | 16.2 | 12.3 | 62 |
| 3 | 16.3 | 16.3 | 69 |

*Example 3*

100 parts each of a mixture consisting of 80 parts of the epoxy compound described in Example 1, which is liquid at room temperature, and 20 parts of dibutyl phthalate are mixed at room temperature:

In Test 1: with 9 parts of triethylene tetramine, and
In Test 2: with 21 parts of a curing agent mixture consisting of 10.5 parts of adduct III and 10.5 parts of triethylene tetramine.

100 grams each of the resulting mixtures are adjusted to exactly 20° C., then poured at room temperature (25° C.) into tins of 4 cm. height and 6 cm. diameter, and the gel times are determined.

One further portion each of the curable mixtures is poured at room temperature, as described in Example 1, into aluminum tubes, and a third portion each of the curable mixtures is used for bonding tests, using the specimens (1) and (2) described above for gluing together test strips of degreased and ground aluminum (170 x 25 x 1.5 mm.; overlap 10 mm.) marketed under the trademark "Anticorodal B." Each casting and the cemented strips are cured for 24 hours at 40° C. The gel times and the properties of the castings, as well as the tensile shear strength of the glued joints are shown in the following table:

| Test | Gel time of 100 g. of mixture at 20° C., in minutes | Impact strength, cm.kg./cm.$^2$ | Flexural strength, kg./mm.$^2$ | Heat distortion accdg. to Martens (DIN) in ° C. | Tensile shear strength, kg./mm.$^2$ |
|---|---|---|---|---|---|
| 1 | 120 | 13.8 | 7.7 | 38 | 0.8 |
| 2 | 75 | 22 | 11.1 | 51 | 0.9 |

*Example 4*

The procedure is as described in Example 1, except that there are used as curing agent In Test 1: 48 parts of adduct I,
In Test 2: 20 parts of a curing agent mixture consisting of 10 parts of adduct I and 10 parts of triethylene tetramine,
In Test 3: 39 parts of adduct II, and
In Test 4: 20 parts of a curing agent mixture consisting of 10 parts of adduct II and 10 parts of triethylene tetramine.

Each casting is cured for 24 hours at 40° C.

The properties of the cured castings are shown in the following table:

| Test | Impact strength, cm.kg./cm.$^2$ | Flexural strength, kg./mm.$^2$ | Heat distortion point according to Martens (DIN) in ° C. |
|---|---|---|---|
| 1 | 7.9 | 13.7 | 65 |
| 2 | 12.6 | 12.6 | 86 |
| 3 | 3.5 | 7.2 | 63 |
| 4 | 8.1 | 12.3 | 87 |

Similar results are obtained when adduct I is replaced by an equivalent amount of adduct VIII.

*Example 5*

The procedure is as described in Example 1, except that there are used as curing agent In Test 1: 10 parts of tris-(N:N-dimethylaminomethyl)-phenol, and
In Test 2: 20 parts of a curing agent mixture consisting of 10 parts of adduct III and 10 parts of 2:4:6-tris-(N:N-dimethylaminomethyl)-phenol.

The properties of the cured casting resin mixtures are shown in the following table:

| Test | Impact strength, cm.kg./cm.$^2$ | Flexural strength, kg./mm.$^2$ | Heat distortion point according to Martens (DIN) in ° C. |
|---|---|---|---|
| 1 | 2.8 | 10.0 | 63 |
| 2 | 3.7 | 10.6 | 93 |

*Example 6*

The procedure is as described in Example 1, except that there are used as curing agent In Test 1: 20 parts of a curing agent mixture consisting of 10 parts of adduct V and 10 parts of triethylene tetramine, and
In Test 2: 20 parts of a curing agent mixture consisting of 10 parts of adduct VII and 10 parts of triethylene tetramine.

The properties of the cured casting resin mixtures are shown in the following table:

| Test | Flexural strength, kg./mm.$^2$ | Heat distortion according to Martens (DIN), in ° C. |
|---|---|---|
| 1 | 9.4 | 75 |
| 2 | 7.5 | 78 |

One further portion each of specimens 1 and 2 is poured in a layer thickness of about 0.1 mm. over glass plates and cured for 24 hours at 40° C. The resulting, flawless hard films adhere excellently to the support and resist 1 hour's action at room temperature of 5 N sulfuric acid, 5 N sodium hydroxide solution, water, acetone and chlorobenzene.

*Example 7*

In 100 parts each of the polyepoxy resin described in Example 1 (which is liquid at room temperature) there are incorporated at room temperature 25 parts each of a curing agent mixture consisting In Test 1: of 18.7 parts of adduct III and 6.3 parts of triethylene tetramine,
In Test 2: of 16.7 parts of adduct III and 8.3 parts of triethylene tetramine, and
In Test 3: of 12.5 parts of adduct III and 12.5 parts of triethylene tetramine.

The resulting casting resin mixtures are poured into aluminum tubes and each casting is cured for 24 hours at 40° C. as described in Example 1.

The properties of the cured castings so obtained are shown in the following table:

| Test | Impact strength, cm.kg./cm.² | Flexural strength kg./mm.² | Heat distortion point according to Martens (DIN) in ° C. |
|---|---|---|---|
| 1 | 10.9 | 11.9 | 85 |
| 2 | 7.5 | 11.2 | 85 |
| 3 | 8.2 | 10.6 | 85 |

What is claimed is:

A process for curing an epoxy resin which comprises contacting an epoxy compound having an epoxy equivalency greater than 1 with a substantially anhydrous mixture of
(1) a polyamine selected from the group consisting of polyalkylenepolyamine and alkylenediamine, and
(2) a compound of the general formula

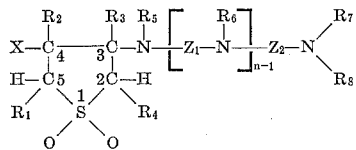

in which each of the residues $R_1$ to $R_8$ is a member selected from the class consisting of hydrogen atom and lower alkyl group with 1 to 4 carbon atoms; X is a member selected from the class consisting of hydrogen, halogen atom, lower alkoxy group and lower alkyl group with 1 to 4 carbon atoms; $Z_1$ and $Z_2$ each are divalent aliphatic hydrocarbon radicals, and $n$ is a whole number from 1 to 4, said mixture containing for every molecular proportion of polyamine (1) 0.25 to 4 molecular proportions of the polyamine plus sulfolene adduct (2).

References Cited by the Examiner

UNITED STATES PATENTS 3,041,352    6/1962    Newey _____ 260—47

OTHER REFERENCES

Grant: "Hackh's Chemical Dictionary" 3rd ed., McGraw-Hill Book Co., Inc., 1944, page 310 relied on.

WILLIAM H. SHORT, *Primary Examiner.*

HAROLD N. BURSTEIN, *Examiner.*

T. D. KERWIN, A. LIBERMAN, *Assistant Examiners.*